US 8,259,850 B2

(12) United States Patent
Huang et al.

(10) Patent No.: US 8,259,850 B2
(45) Date of Patent: Sep. 4, 2012

(54) UWB TRANSMISSION APPARATUS AND UWB TRANSMISSION METHOD

(75) Inventors: Lei Huang, Singapore (SG); Ping Luo, Singapore (SG); Suguru Fujita, Tokyo (JP); Kazuaki Takahashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 735 days.

(21) Appl. No.: 12/377,113

(22) PCT Filed: Oct. 10, 2007

(86) PCT No.: PCT/JP2007/069753
§ 371 (c)(1),
(2), (4) Date: Feb. 10, 2009

(87) PCT Pub. No.: WO2008/047642
PCT Pub. Date: Apr. 24, 2008

(65) Prior Publication Data
US 2010/0166037 A1 Jul. 1, 2010

(30) Foreign Application Priority Data

Oct. 16, 2006 (JP) .................................. 2006-281746
Oct. 9, 2007 (JP) .................................. 2007-263472

(51) Int. Cl.
*H04L 27/20* (2006.01)
(52) U.S. Cl. .................................................. 375/308
(58) Field of Classification Search .................. 375/130, 375/261, 280, 300, 308, 329, 340; 455/41.1
See application file for complete search history.

(56) References Cited

U.S. PATENT DOCUMENTS

| 6,160,855 | A | * | 12/2000 | Nakamura et al. | ............ 375/280 |
| 2003/0147475 | A1 | | 8/2003 | Sasabata | |
| 2003/0157888 | A1 | * | 8/2003 | Inoue | ............... 455/41 |
| 2005/0152474 | A1 | * | 7/2005 | Murakami et al. | ............ 375/308 |
| 2005/0185727 | A1 | | 8/2005 | Tanaka | |

FOREIGN PATENT DOCUMENTS

| JP | 2-190063 | 7/1990 |
| JP | 2002-281098 | 9/2002 |
| JP | 2003-244260 | 8/2003 |
| JP | 2004-147052 | 5/2004 |
| JP | 2005-278162 | 10/2005 |

OTHER PUBLICATIONS

International Search Report dated Nov. 20, 2007.

* cited by examiner

*Primary Examiner* — Leon-Viet Nguyen
(74) *Attorney, Agent, or Firm* — Dickinson Wright PLLC

(57) ABSTRACT

A UWB transmission apparatus that, in a system using a mixture of amplitude and phase modulation schemes, can support both of the amplitude and phase modulation schemes, while preventing the signal powers of amplitude-modulated signals from degrading. In this UWB transmission apparatus, if the modulation mode is of QPSK, a mapping part (121) selects one of four signal points on the IQ plane in accordance with a 2-bit data, and outputs information related to the I- and Q-components of the selected signal point to a QPSK/ASK modulated signal forming part (122). If the modulation mode is of ASK, the mapping part (121) selects the origin point on the IQ plane when the data being '0' and selects one of four signal points on the IQ plane, similarly to the case of QPSK modulation, when the data being '1,' and outputs information, which is related to the selected signal point, to the QPSK/ASK modulated signal forming part (122).

8 Claims, 11 Drawing Sheets

UWB TRANSMISSION APPARATUS AND UWB TRANSMISSION METHOD

TECHNICAL FIELD

The present invention relates to a UWB (Ultra Wide Band) transmitting apparatus and UWB transmitting method. More particularly, the present invention relates to a UWB transmitting apparatus and UWB transmitting method supporting an amplitude modulation and phase modulation schemes in a UWB system where there are both modulation schemes.

BACKGROUND ART

UWB (Ultra Wide Band) is focused upon as a radio scheme of ultra low power consumption that enables higher speed compared to conventional mobile telephones and wireless LAN (Local Area Network) and that enables implementation in portable equipment such as mobile telephones. While wireless systems used today perform communication using frequency bands of several dozens of MHz, the UWB wireless system refers to a wireless system that performs communication using bands of several hundreds of MHz to several GHz. Following legislation the main point of which is to allow, as UWB communication, short pulse communication using frequency bands of 3.1 to 10.6 GHz if the frequency band is equal to or less than the unnecessary radiation level of, for example, a personal computer designated in Part 15 according to FCC in the U.S.A. in 2002, UWB communication is actively studied.

As the method for implementing the UWB wireless system, single carrier communication including short pulse communication is regarded promising as a scheme that enables low power consumption. Mainly, there are the amplitude modulation scheme (ASK: Amplitude Shift Keying) and phase modulation scheme (PSK: Phase Shift Keying) as modulation schemes used in single carrier communication. Data is superimposed by the strength of signals according to the amplitude modulation scheme, so that the performance required with respect to the oscillator is low and implementation of the amplitude modulation scheme is anticipated at low cost and at low power consumption. On the other hand, the phase modulation scheme requires an oscillator with low phase noise for superimposing data on the phases of signals, and so requires great power consumption compared to the amplitude modulation scheme. However, the phase modulation scheme does not cause performance deterioration due to threshold value control for deciding between "0's" and "1's," which is required to demodulate amplitude modulation signals, and provides an advantage for a higher function of realizing higher speed transmission using M-ary phase modulation schemes.

Consequently, UWB communication assumes an environment of usage where there are UWB transmitting apparatuses that perform amplitude modulation and UWB transmitting apparatuses that perform phase modulation using the same frequency band, and realization of a UWB transmitting apparatus using both adequately is demanded.

Patent Document 1 discloses a transmitting apparatus that can support both the amplitude modulation scheme and phase modulation scheme. FIG. 1 shows components of the transmitting apparatus disclosed in Patent Document 1. In this transmitting apparatus, upon ASK modulation, QPSK baseband processing section 1, ASK baseband processing section 2 and common transmission signal processing section 11 generate, according to input data, a zero-value Q-value component and a binary I-value component varying between the intersecting point (i.e. original point) between the I-axis and the Q-axis and a signal point on the I-axis, and input the result to a QPSK modulator. On the other hand, upon. QPSK modulation, ASK baseband processing section 2 and common transmission signal processing section 11 generate a multi-value I-value component and a multivalue Q-value component according to input data and input the result to QPSK modulator 60, in order to perform QPSK modulation and ASK modulation of carriers.

Patent Document 1: Japanese Patent Application Laid-Open No. 2004-147052

DISCLOSURE OF INVENTION

Problems to be Solved by the Invention

However, the above transmitting apparatus forms an amplitude modulation signal by changing the Q-value component to 0 and the I-value component to a binary, so that there is a problem that the output power of an amplitude modulation signal decreases compared to a phase modulation signal and the received quality of the amplitude modulation signal deteriorates.

It is therefore an object of the present invention to provide a UWB transmitting apparatus and UWB transmitting method for, in a system where there are the amplitude modulation scheme and phase modulation scheme, preventing a decrease in the signal power of an amplitude modulation signal and supporting both modulation schemes of the amplitude modulation scheme and phase modulation scheme.

Means for Solving the Problem

To solve the above problem, the UWB transmitting apparatus according to the present invention that enables transmission in amplitude modulation mode and transmission in phase modulation mode, employs a configuration including: a selecting section that selects one of the amplitude modulation mode and the phase modulation mode; and a transmission signal forming section that, when selected mode is the amplitude modulation mode, generates an amplitude modulation signal using a first value as an amplitude level, by forming a symbol located in an original point on an IQ plane, or generates an amplitude modulation signal using a second value as an amplitude level, by forming a symbol located in one of a plurality of signal points on the IQ plane in phase modulation, according to data per symbol and, when the selected mode is the phase modulation mode, generates a phase modulation signal by forming a symbol located in one of the plurality of signal points on the IQ plane in the phase modulation, according to the data per symbol.

According to this configuration, in amplitude modulation mode, an amplitude modulation signal of an off signal can be generated by forming the symbol located in the original point on the IQ plane and an on signal in amplitude modulation can be generated by forming the symbol located in one of a plurality of signal points on the IQ plane, and, consequently, compared to the case where an on/off signal is generated by simply making the Q-component zero and changing the I-component between zero and a predetermined value, the signal power of an on signal in amplitude modulation matches with signal power of a phase modulation signal, so that it is possible to prevent a decrease in the signal power upon modulation mode switching and reduce deterioration of received quality.

Advantageous Effect of the Invention

In a system where there are the amplitude modulation scheme and phase modulation scheme, the present invention makes it possible to support both modulation schemes of the amplitude modulation scheme and phase modulation scheme without decreasing the signal power upon formation of amplitude modulation signals.

BEST MODE FOR CARRYING OUT THE INVENTION

Hereinafter, embodiments of the present invention will be described in detail with reference to the accompanying drawings.

Embodiment 1

Figure 1:
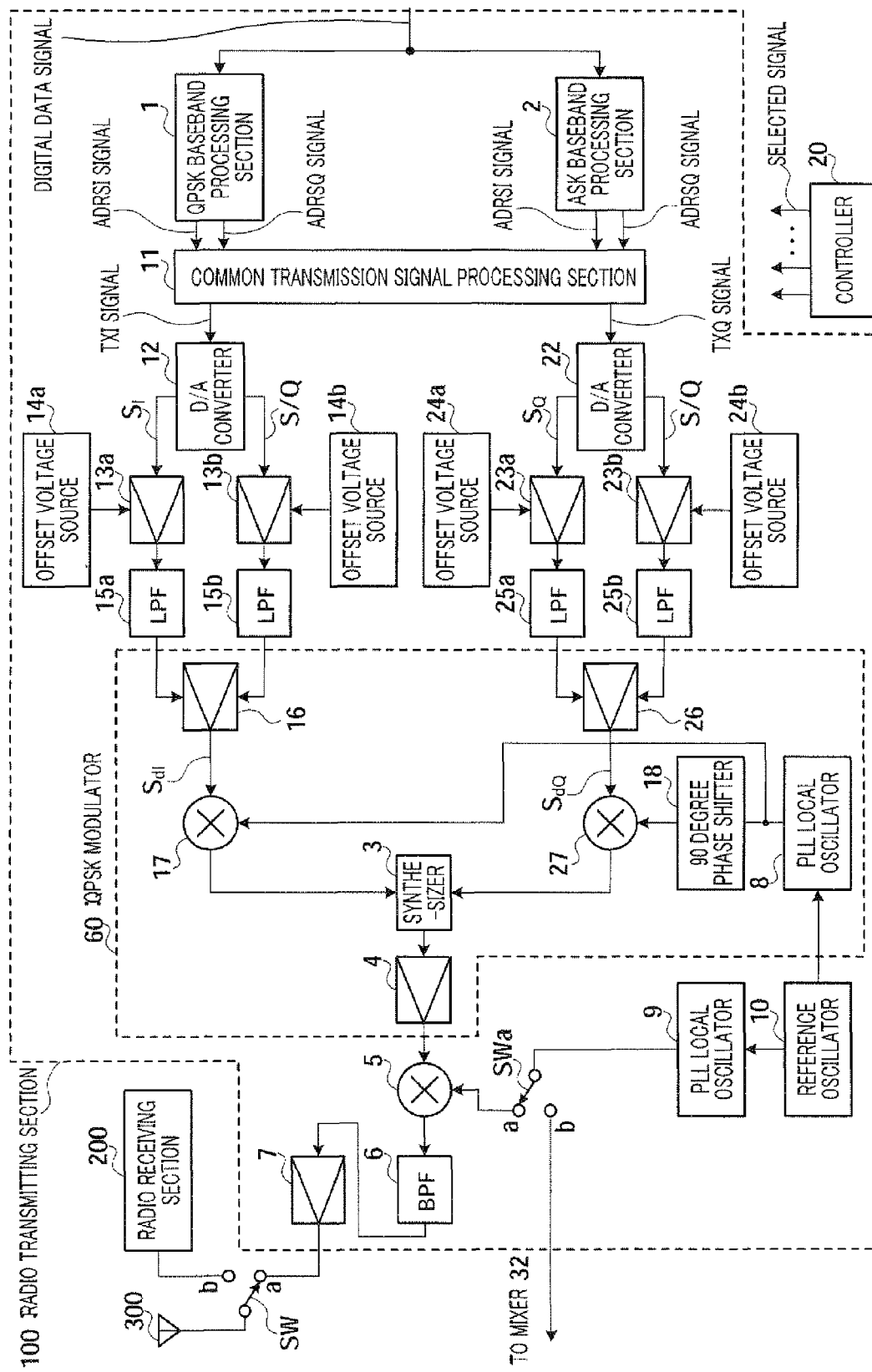
FIG. 1 is a block diagram showing main components of a conventional UWB transmitting apparatus.
Figure 2:
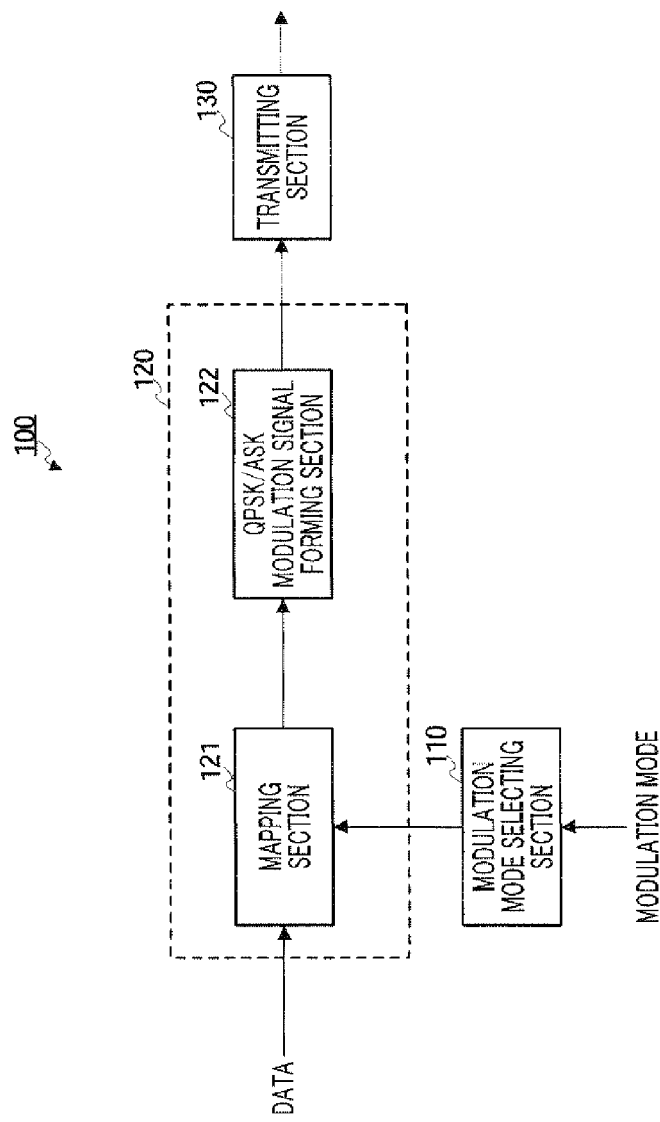
FIG. 2 is a block diagram showing main components of a UWB transmitting apparatus according to Embodiment 1 of the present invention.

FIG. 2 shows main components of the UWB transmitting apparatus according to the present embodiment. UWB transmitting apparatus 100 shown in FIG. 2 has modulation mode selecting section 110, transmission signal forming section 120 and transmitting section 130, and transmission signal forming section 120 has mapping section 121 and QPSK/ASK modulation signal forming section 122. Further, a case will be described below where, upon ASK modulation, QPSK/ASK modulation signal forming section 122 forms an off signal (i.e. there is no pulse) when data is "0" and forms an on signal (i.e. there is a pulse) when data is "1."

Modulation mode selecting section 110 selects either to transmit data after performing QPSK modulation or to transmit data after performing ASK modulation, acquires modulation mode selecting command information from, for example, a controlling apparatus (not shown) and outputs information related to the selected or acquired modulation mode to mapping section 121.

Figure 3:
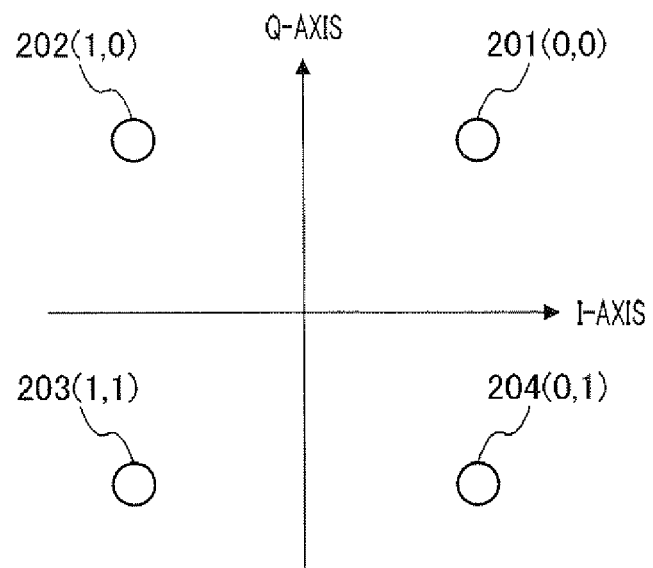
FIG. 3 shows a constellation used in Embodiment 1.

When the selected modulation mode is QPSK modulation, mapping section 121 selects one of four signal points on the IQ plane according to the two bit data, and outputs information related to the I-component and Q-component of the selected signal point to QPSK/ASK modulation signal forming section 122. FIG. 3 shows a signal point arrangement on the IQ plane when the selected modulation mode is QPSK modulation. In FIG. 3, signal point 201 is the signal point when two bit data is "0, 0," signal point 202 is the signal point when two bit data is "1, 0," signal point 203 is the signal point when two bit data is "1, 1," and signal point 204 is the signal point when two bit data is "0, 1." Further, the combination of two bit data corresponding to signal points is not limited to the combination shown in FIG. 3.

Figure 4:
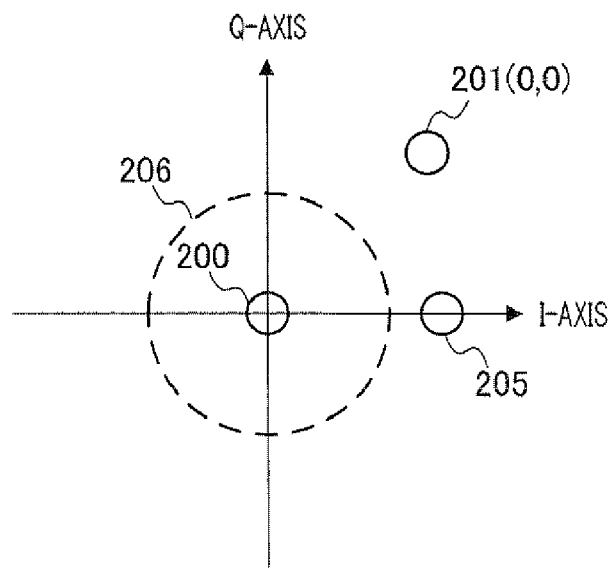
FIG. 4 shows a constellation used in Embodiment 1.

On the other hand, when the modulation mode is ASK modulation, mapping section 121 selects the original point on the IQ plane when data is "0," selects one of four signal points 201 to 204 on the IQ plane in QPSK modulation shown in FIG. 3 when data is "1" and outputs information related to the I-component and Q-component of the selected signal point, to QPSK/ASK modulation signal forming section 122. FIG. 4 shows the signal point arrangement on the IQ plane when the modulation mode is ASK modulation. The signal point arrangement shown in FIG. 4 is an example of a case where a signal point selected when one bit data is "0" is signal point 200 (i.e. original point) and a signal point selected when one bit data is "1" is signal point 201 in FIG. 3. Further, upon ASK modulation, the receiving side is able to detect whether or not there is a pulse and demodulate data by setting the radius of the circle shown by dotted line 206 in FIG. 4 to a threshold value and performing threshold decision.

Using information related to the I-component and Q-component outputted from mapping section 121, QPSK/ASK modulation signal forming section 122 forms the symbol located in the signal point selected by mapping section 121 and generates a QPSK modulation signal or ASK modulation signal.

Transmitting section 130 carries out predetermined radio transmission processing of the QPSK modulation signal or ASK modulation signal and transmits the signal.

Next, the operation of UWB transmitting apparatus 100 configured as described above will be described.

First, the modulation mode selected by modulation mode selecting section 110 or reported from, for example, a controlling apparatus (not shown) is outputted to mapping section 121. Here, the modulation mode refers to information related to a modulation scheme regarding whether to carry out QPSK modulation of data and transmit data or carry out ASK modulation of data and transmit data.

Then, according to modulation mode and data, mapping section 121 selects a signal point to be transmitted, from signal points on the IQ plane. To be more specific, in case of QPSK modulation mode, according to two bit data, one of four signal points on the IQ plane is selected as shown in FIG. 3. Then, information related to the I-component and Q-component of the selected signal point is outputted to QPSK/ASK modulation signal forming section 122 and a QPSK modulation signal is formed in QPSK/ASK modulation signal forming section 122.

On the other hand, in case of ASK modulation mode, according to one bit data, mapping section 121 selects the original point on the IQ plane or one of four signal points on the IQ plane in QPSK modulation as shown in FIG. 4. Then, information related to the I-component and Q-component of the selected signal point is outputted to QPSK/ASK modulation signal forming section 122 and an ASK modulation signal is formed in QPSK/ASK modulation signal forming section 122.

In this way, in case of ASK modulation mode, mapping section 121 selects the original point on the IQ plane or one of four signal points on the IQ plane in QPSK modulation according to one bit data. Next, QPSK/ASK modulation signal forming section 122 forms a symbol located in the selected signal point and generates an ASK modulation signal. Consequently, compared to the case where an on/off signal is generated by changing a signal point between two points of original point 200 (0, 0) and signal point 205 on the I-axis, that is, between (0, 0) on the Q-axis and a binary of zero and a predetermined value on the I-axis, according to data, the signal power of an on signal increases. Further, the signal power of an on signal in ASK modulation matches with the signal power of a QPSK modulation signal, so that it is possible to prevent a decrease in the signal power upon modulation mode switching and reduce deterioration of received quality.

Further, by forming an on signal using the symbol located in signal point 201 used upon QPSK modulation, while receiving the on signal in ASK modulation, the receiving side practically acquires synchronization for the signal point used upon QPSK modulation. Consequently, when the modulation mode switches from ASK modulation mode to QPSK modulation mode, the result of the synchronizing location acquired for an ASK modulation signal is reflected and the synchronizing location for a QPSK modulation signal can be acquired, so that it is possible to reduce the time required to acquire synchronization.

Although a case has been described with the above description where, upon ASK modulation, QPSK/ASK modulation signal forming section 122 generates an off signal by forming the symbol located in original point 200 as shown in FIG. 4 and generates anon signal by forming the symbol located in signal point 201, the present embodiment is not limited to one signal point 201 and an on signal may be generated in mapping section 121 by transferring the signal point to be located from signal points 201 to 204 over time and forming a signal.

By this means, even when the waveform is distorted due to the influence of multipath, the channel or the frequency characteristics of the analogue circuit of UWB transmitting apparatus 100, anon signal in ASK modulation is formed using all signal points used upon QPSK modulation. Consequently, when the modulation mode switches from ASK modulation mode to QPSK modulation mode, the synchronized state for the ASK modulation signal can be reflected when synchronization for the QPSK modulation signal is acquired, acquisition of synchronization for demodulating the QPSK modulation signal is facilitated.

That is, by carrying out transmission such that each of four signal points is selected as the same number of times as possible, there is an advantage that the synchronized state is not biased to one phase on the receiver side. Hereinafter, an additional explanation will be made with reference to the signal point arrangement on the IQ plane upon reception in FIG. 6. In FIG. 6, five reception points 200-1 to 204-1 refer to the reception points with respect to five signal points 200 to 204 shown in FIG. 5.

Upon ASK modulation, when mapping section 121 generates an on signal by forming the symbol located in signal point 201, the synchronizing location is determined using an axis (dotted line 210) acquired from only two points of reception point 200-1 and reception point 201-1 located in the first quadrant. Consequently, when the waveform in reception point 201-1 is distorted due to the influence of multipath, the channel and the frequency characteristics of the analogue circuit part of a radio device and the receiving location is distorted by fluctuation in the amplitude and phase difference, the axis (dotted line 210) is likely to drift significantly from the axis for the signal point arrangement in QPSK modulation. Therefore, immediately after the modulation mode switches from ASK modulation mode to QPSK modulation mode, the axis is not necessarily adequately positioned with respect to reception points 202-1 to 204-1 located in the other quadrants, and therefore there is a possibility that reception points 202-1 to 204-1 are decided by error.

By contrast with this, when an on signal is generated in mapping section 121 by transferring signal points to be located from signal points 201 to 204 over time and forming a symbol, there is a case, for example, where the waveform is distorted due to the influence of multipath, the channel and the frequency characteristics of the analogue circuit part of a radio device, the amplitude and phase difference fluctuate and the degree of fluctuation varies between reception points. By this means, when the receiving locations are distorted, by using axes (solid lines 220) acquired from the five points of reception point 200-1 and reception points 201-1 to 204-1 located in the first, second, third and fourth quadrants, that is, by using axes at equal inter-signal point distances (solid lines 220) with respect to four reception points 201-1 to 204-1, synchronizing locations for signal point candidates can be determined. Consequently, when the modulation mode switches from ASK modulation mode to QPSK modulation mode, compared to the case where dotted lines 201 are used, the rate of erroneously deciding reception points 201-1 to 204-1 decreases and reception precision can be improved.

Figure 7:
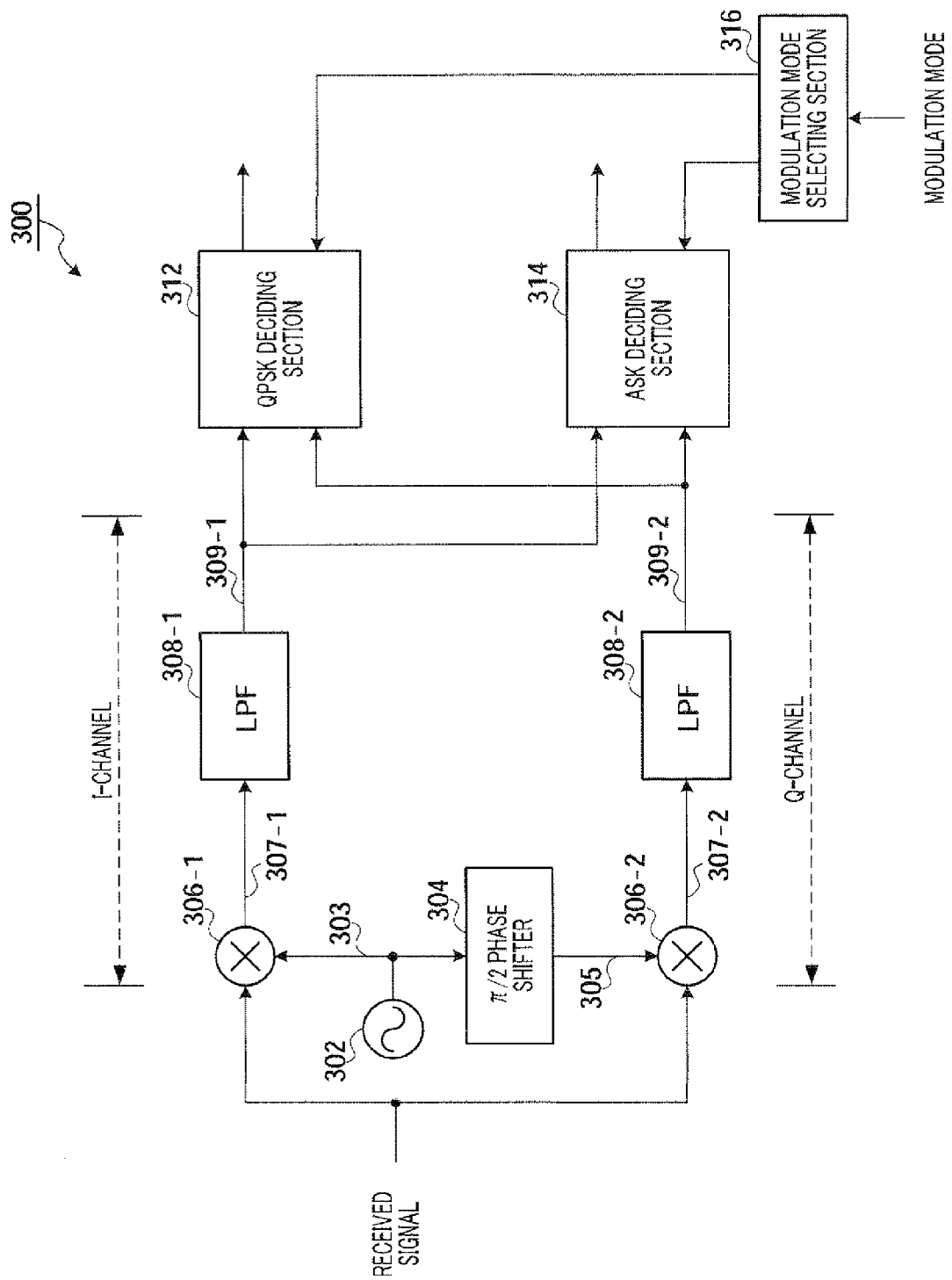
FIG. 7 is a block diagram showing main components of the UWB receiving apparatus according to Embodiment 1.

FIG. 7 shows main components of the UWB receiving apparatus. UWB receiving apparatus 300 shown in FIG. 7 has local oscillator 302, $\pi/2$ phase shifter 304, multipliers 306-1 and 306-2, LPF's (Low Pass Filters) 308-1 and 308-2, QPSK deciding section 312, ASK deciding section 314 and modulation mode selecting section 316.

The demodulation operation of UWB receiving apparatus 300 configured as described above will be described. As shown in FIG. 7, a received signal is outputted to multipliers 306-1 and 306-2. Then, multiplier 306-1 multiplies the received signal with carrier 303 outputted from local oscillator 302, and outputs the result to LPF 308-1. By contrast with this, multiplier 306-2 multiplies the received signal with carrier 305 with the phase shifted by $\pi/2$ by $\pi/2$ phase shifter 304, and outputs the result to LPF 308-2.

Multiplication results 307-1 and 307-2 outputted from multipliers 306-1 and 306-2 are subjected to band limitation by LPF's 308-1 and 308-2, and baseband signal 309-1 of the I-component (i.e. in-phase) and baseband signal 309-2 of the Q-component (i.e. quadrature) are acquired and outputted to QPSK deciding section 312 and ASK deciding section 314.

Then, when the modulation mode is QPSK modulation mode, modulation mode selecting section 316 performs control such that only QPSK deciding section 312 is operated and ASK deciding section 314 is not operated. On the other hand, when the modulation mode is ASK modulation mode, modulation mode selecting section 316 performs control such that only ASK deciding section 314 is operated and QPSK deciding section 312 is not operated. Further, the modulation mode may be decided, for example, by carrying out QPSK demodulation of received data first, then carrying out ASK demodulation of received data and deciding as the modulation mode the modulation scheme that demodulates received data adequately, and the present embodiment is not limited to this.

Figure 8:
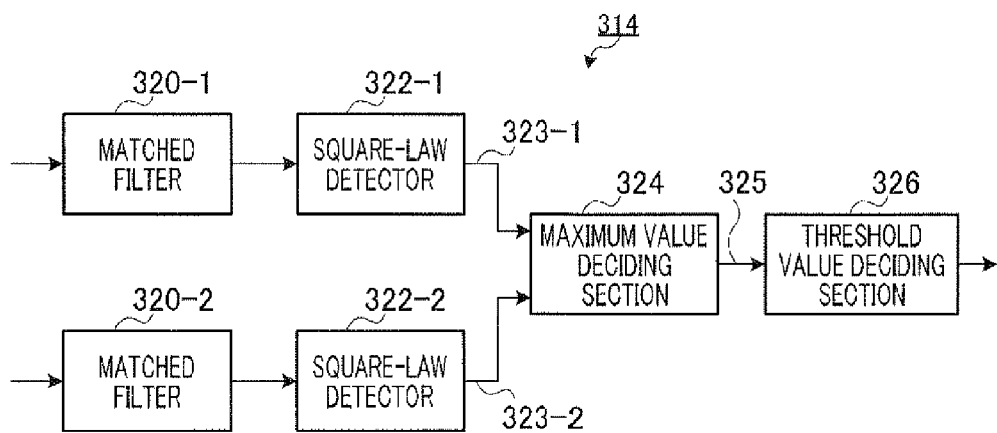
FIG. 8 is a block diagram showing main components of an ASK deciding section according to Embodiment 1.

FIG. 8 shows main components of ASK deciding section 314. ASK deciding section 314 shown in FIG. 8 has matched filters 320-1 and 320-2, square-law detectors 322-1 and 322-2, maximum value deciding section 324 and threshold value deciding section 326. Here, maximum value deciding section 324 compares square-law detection results 323-1 and 323-2 in square-law detectors 322-1 and 322-2, and outputs the larger square-law detection result of square-law detection results 323-1 and 323-2 as maximum value 325. Threshold value deciding section 326 carries out ASK decision by carrying out hard decision with respect to maximum value 325.

Figure 9:
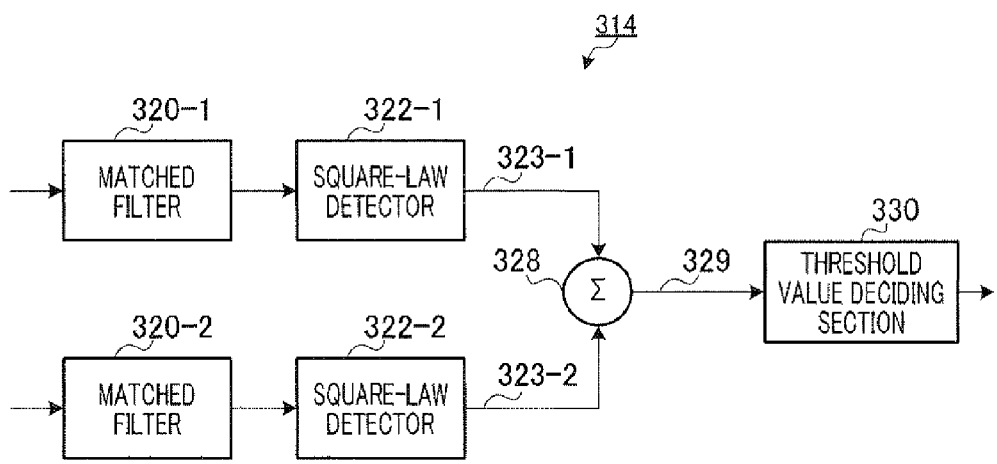
FIG. 9 is a block diagram showing main components of the ASK deciding section according to Embodiment 1.
Figure 10:
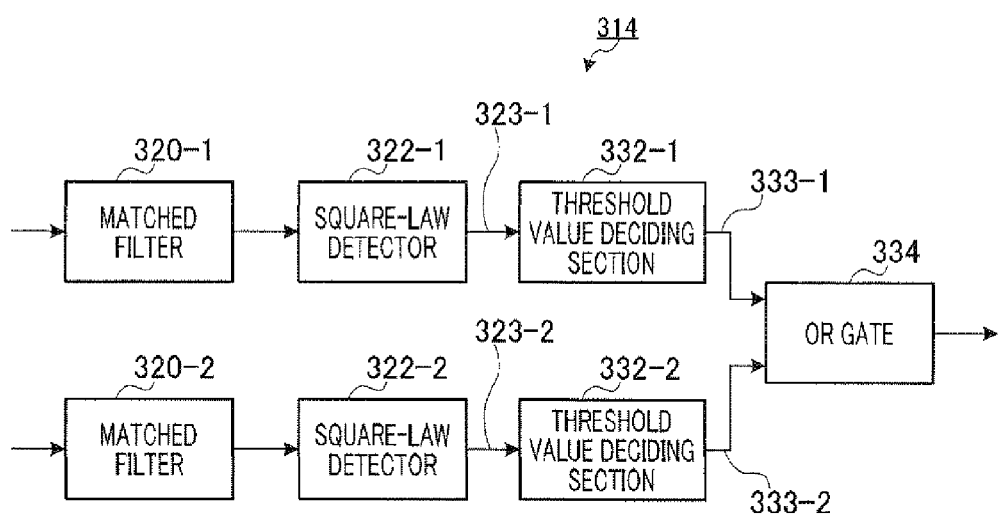
FIG. 10 is a block diagram showing main components of the ASK deciding section according to Embodiment 1.

Further, ASK deciding section 314 may be configured with the processing sections shown in FIG. 9 and FIG. 10. ASK deciding section 314 shown in FIG. 9 has matched filters 320-1 and 320-2, square-law detectors 322-1 and 322-2, adder 328 and threshold value deciding section 330, adder 328 adds square-law detection result 323-1 and square-law detection result 323-2 and threshold value deciding section 330 carries out ASK decision by carrying out hard decision with respect to added value 329.

ASK deciding section 314 shown in FIG. 10 has matched filters 320-1 and 320-2, square-law detectors 322-1 and 322-2, threshold value deciding sections 332-1 and 332-2 and OR gate 334, threshold value deciding sections 332-1 and 332-2 carry out hard decision with respect to square-law detection results 323-1 and 323-2 and OR gate 334 calculates a logical add of hard decision result 333-1 and hard decision result 333-2. Further, the above-described main components of ASK deciding section 314 can be configured using an existing technique and the main components of ASK deciding section 314 are not limited to the main components shown in FIG. 8 to FIG. 10.

Next, that the synchronization acquisition time can be shortened by forming a symbol in which an on signal is located in one of signal points 201 to 204 shown in FIG. 5 upon ASK modulation, will be described below with reference to FIG. 11. FIG. 11 shows an example of formats of transmission frames transmitted from UWB transmitting apparatus 100 to the communicating party in a system where there are QPSK modulation mode and ASK modulation mode.

Figure 11A:
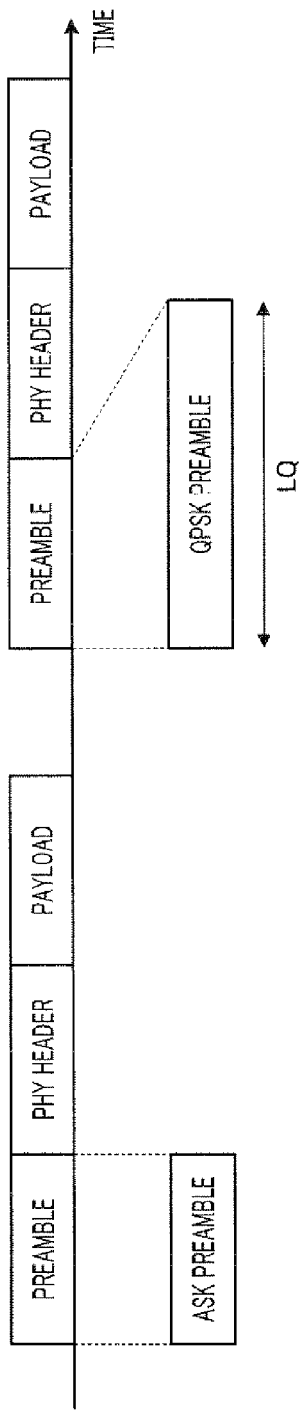
FIG. 11 shows an example of formats of transmission frames.
Figure 11B:
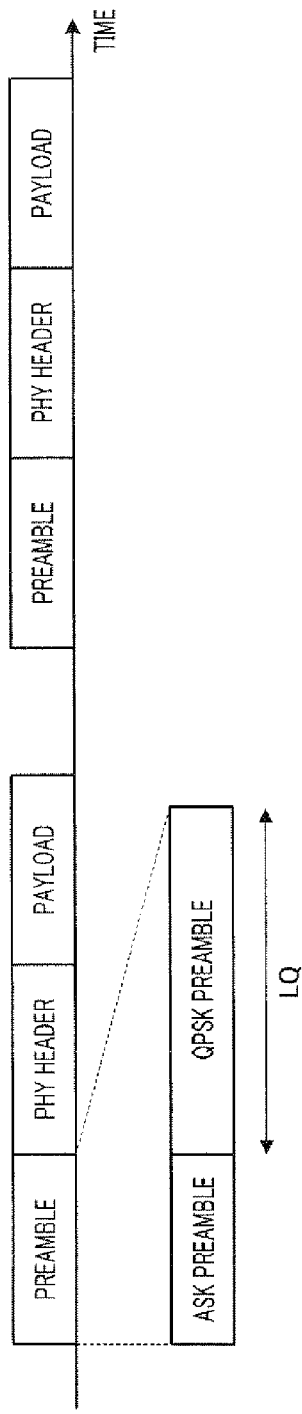

FIG. 11A and FIG. 11B show an example of a format of a transmission frame in a case where, as disclosed in, for example, Patent Document 1, upon ASK modulation, a different signal point from a signal point in QPSK modulation is selected and the symbol located in this different signal point is formed. In this case, as shown in FIG. 11A and FIG. 11B, an ASK preamble and QPSK preamble (where a preamble length is LQ) need to be assigned separately to a transmission frame.

Figure 5:
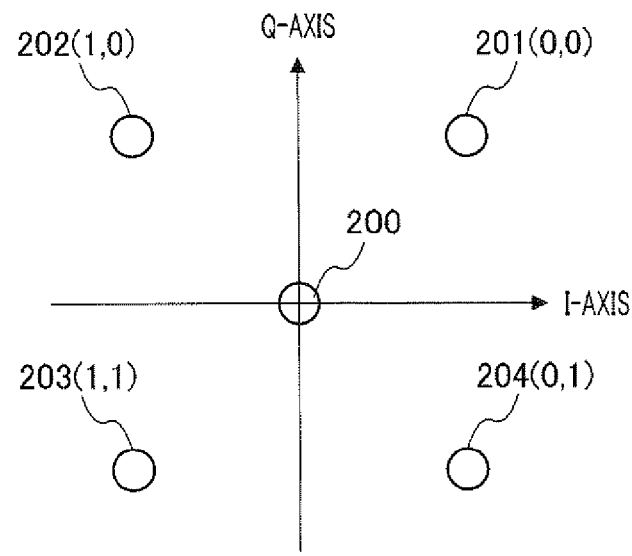
FIG. 5 shows the constellation for illustrating a signal point arrangement used in Embodiment 1.
Figure 6:
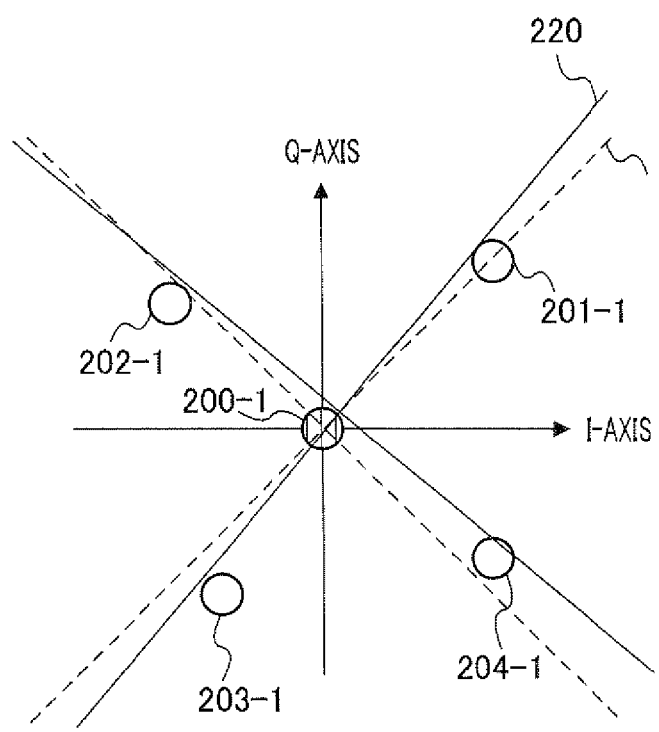
FIG. 6 illustrates that synchronizing locations are different due to the difference in the signal point arrangement used in Embodiment 1.
Figure 11C:
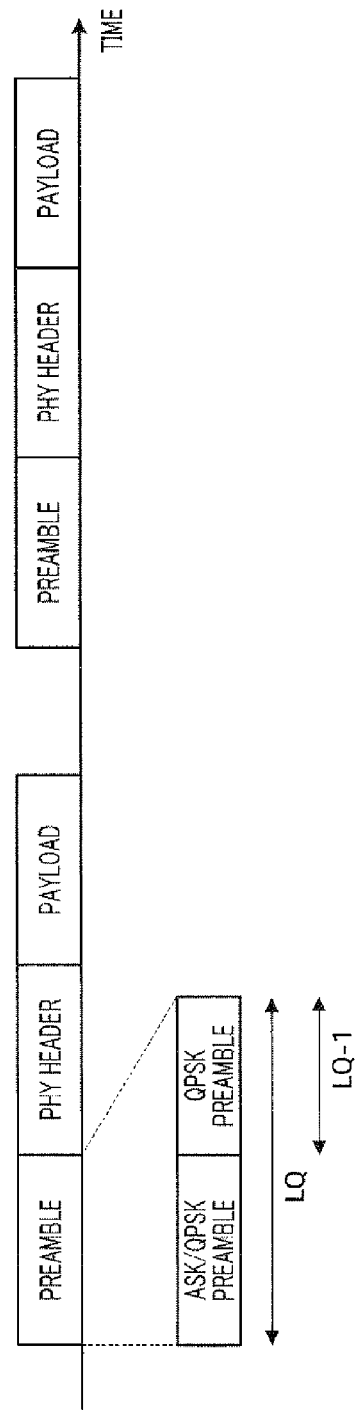

By contrast with this, as shown in FIG. 5, when an on signal is generated upon ASK modulation by selecting a signal point in which the symbol is located, from signal points 201 to 204 in QPSK modulation, an ASK/QPSK preamble can be shared. Consequently, as shown in FIG. 11C, the preamble length of the QPSK preamble can be shortened to LQ−1.

Generally, synchronization for an ASK modulation signal may require lower precision compared to synchronization for a QPSK modulation signal, and so the synchronization time is short. Consequently, the ASK modulation signal generated by forming a symbol located in signal points 201 to 204 in QPSK modulation as shown in FIG. 5 is transmitted as the ASK preamble which is synchronization information of ASK modulation, so that the receiver side is able to learn the signal point candidates in QPSK modulation not precisely, but roughly. Generally, it is decided that synchronization is acquired if the correlation value between a plurality of bits is higher. Consequently, even if synchronization is not precisely acquired, as long as synchronization is roughly acquired by the ASK preamble, the correlation value becomes high. As a result, it takes a short time to precisely acquire synchronization using a subsequent QPSK preamble. That is, shortening the preamble length of the QPSK preamble becomes possible.

Although FIG. 11 illustrates a case where an ASK preamble is located before a QPSK preamble, a QPSK preamble may be located before an ASK preamble.

Here, a case will be described where an on signal is generated upon ASK modulation by selecting only signal point 201 as the signal point when data is "1" as shown in FIG. 4 and forming the symbol located in this signal point. That is, in FIG. 4, if an on signal is generated in one phase location alone, when the modulation mode switches from ASK modulation mode to QPSK modulation mode, it is difficult for an ASK preamble alone to sufficiently follow synchronization for a QPSK modulation signal, so that synchronization needs to be acquired precisely using the QPSK preamble.

By contrast with this, if an ASK modulation signal is generated by forming the symbol located in each signal point using five phase locations shown in FIG. 5 and the ASK/QPSK preamble is transmitted, a modulation signal obtained by superimposing the ASK modulation signal and QPSK modulation signal is transmitted. Consequently, synchronization can be acquired with respect to the QPSK modulation signal using the ASK/QPSK preamble, so that synchronization can be acquired using the ASK/QPSK preamble alone or a short QPSK preamble subsequent to this ASK/QPSK preamble. Upon comparison of the above three transmission frame configurations, the periods of a preamble and a PHY header (including information for, for example, the designated modulation scheme, recognized device and the payload length) which are not related to actual communication are the shortest, so that it is possible to efficiently transmit data (i.e. payload).

As described above, according to the present embodiment, in case of ASK modulation mode, when data is "0," an off signal is generated by forming the symbol located in the original point on the IQ plane, and, when data is "1," an on signal is generated by forming the symbol located in one of four signal points on the IQ plane in QPSK modulation. Consequently, compared to a case where an on/off signal is generated by simply making the Q-component zero and changing the I-component between zero and a predetermined value, the signal power of an on signal in ASK modulation matches with the signal power of a QPSK modulation signal, so that it is possible to prevent a decrease in the signal power upon modulation mode switching and reduce deterioration of received quality.

Further, a signal point in which the symbol is located per bit when data is "1" is selected as shown in FIG. 5 from signal points 201 to 204 upon QPSK modulation, and the synchronizing location is determined from five reception points 200-1 to 204-1 for five signal points 200 to 204 as shown in FIG. 6. Consequently, even when the signal point arrangement is distorted due to, for example, the influence of multipath as shown in FIG. 6, the synchronizing location can be determined more precisely as shown by the solid lines in FIG. 6 compared to the case where the synchronizing location is determined only from two reception points 200-1 and 201-1 as shown by dotted lines in FIG. 6. By so doing, the synchronizing location can be calculated more precisely, so that it is possible to improve reception precision.

Further, an on signal in ASK modulation is generated using the signal point arrangement for a QPSK modulation signal. Consequently, a preamble can be shared between QPSK modulation and ASK modulation, so that, when the modulation mode switches from ASK modulation mode to QPSK modulation mode, the synchronization acquisition time for demodulating the QPSK modulation signal can be shortened. By this means, the preamble length of a preamble required for synchronization acquisition can be shortened, and consequently it is possible to transmit the payload efficiently.

Further, although a case has been described with the above description where an on signal is formed using four signal points, that is, using four phases, on the IQ plane, the same advantage can be provided by forming an on signal using two or three phases. When an on signal is generated using two phases, it would be desirable to form the on signal by locating a symbol in signal points in which phase locations are spaced apart by $\pi/4$ rather than signal points in which phase locations are spaced apart by $\pi/2$ because the synchronizing location can be calculated precisely.

Further, although a case has been described with the above description where QPSK modulation is used for phase modulation, the present embodiment can be implemented likewise using BPSK modulation.

Further, although a case has been described above where OOK modulation is used as ASK modulation, the present embodiment may be implemented by using binary ASK and leaving phase information in a signal to which a predetermined amplitude is added, without locating a symbol of a small amplitude value in the original point on the IQ plane. In this case, in an apparatus that demodulates a phase modulation signal, phase information can be extracted from a symbol of small amplitude, so that it is possible to calculate the synchronizing location more precisely.

Further, the present embodiment can be implemented likewise in case of M-ary ASK modulation. In this case, to generate an M-ary ASK modulation signal, the present embodiment may be implemented by adding a modulator for making transmission amplitude a multivalue, to a phase modulator. Further, it naturally follows that the phase modulator may be a predetermined M-ary QAM modulator that also carries out amplitude modulation.

Embodiment 2

Figure 12:
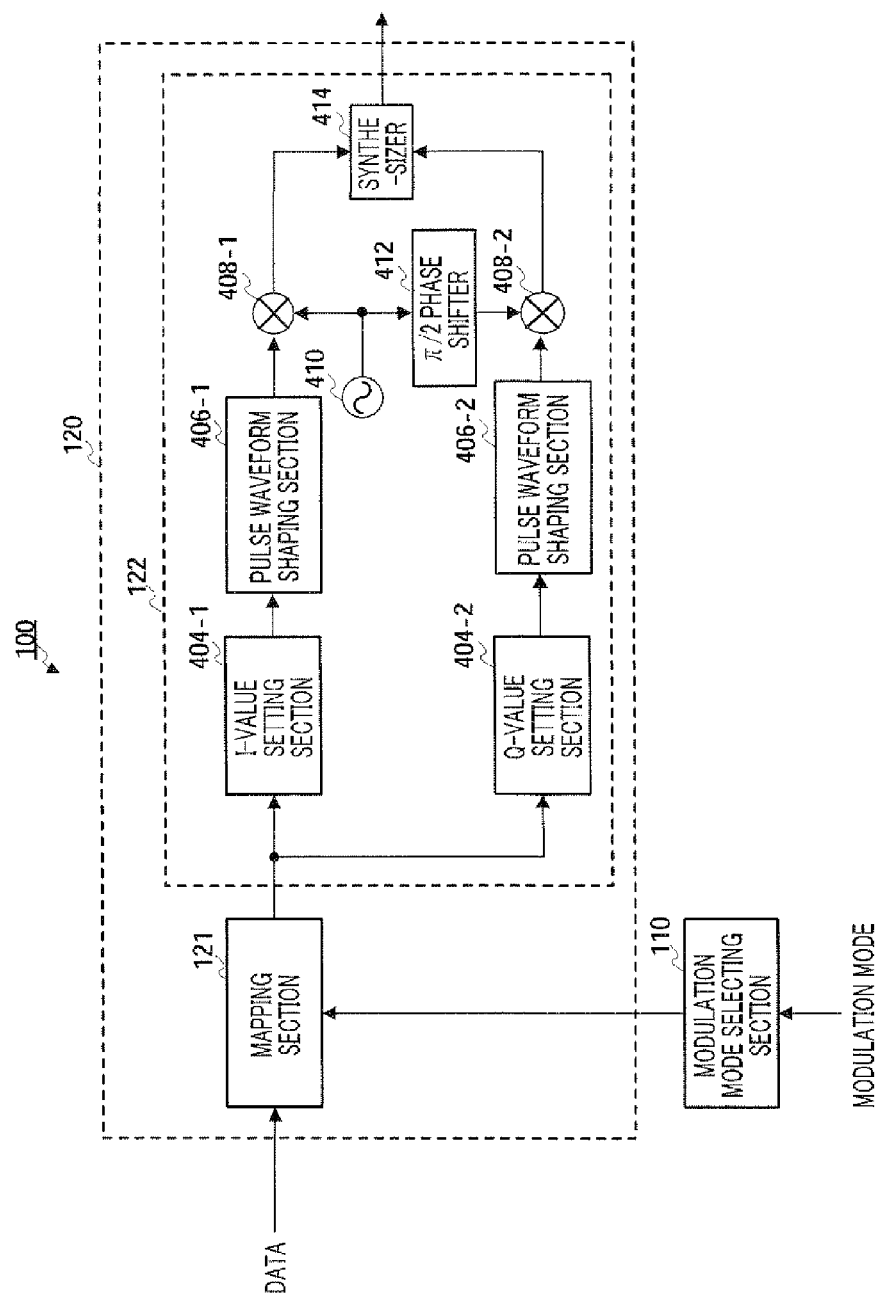
FIG. 12 is a block diagram showing main components of the UWB transmitting apparatus according to Embodiment 2 of the present invention.

FIG. 12 shows main components of transmission signal forming section 120 according to the present embodiment. Transmission signal forming section 120 shown in FIG. 12 has mapping section 121, I-value setting section 404-1, Q-value setting section 404-2, pulse waveform shaping sections 406-1 and 406-2, multipliers 408-1 and 408-2, local oscillator 410, $\pi/2$ phase shifter 412 and synthesizer 414.

Mapping section 121 selects a signal point according to the modulation mode outputted from modulation mode selecting section 110, outputs the I-component of the selected signal point to I-value setting section 404-1 and outputs the Q-component to Q-value setting section 404-2. To be more specific, in case of QPSK modulation mode, the I-component and Q-component of a signal point matching two bits of input data are outputted to I-value setting section 404-1 and Q-value setting section 404-2. On the other hand, incase of ASK modulation mode, zero is outputted as the I-component and the Q-component to I-value setting section 404-1 and Q-value setting section 404-2 when input data is "0," a signal point is selected from four signal points in the signal point arrangement of FIG. 5 when input data is "1" and the I-component and Q-component matching the selected signal point are outputted to I-value setting section 404-1 and Q-value setting section 404-2.

Pulse waveform shaping sections 406-1 and 406-2 carry out pulse waveform shaping of the I-component outputted from I-value setting section 404-1 and the Q-component outputted from Q-value setting section 404-2, and outputs the result to multipliers 408-1 and 408-2.

Multiplier 408-1 multiplies the I-component after pulse waveform shaping, with the carrier outputted from local oscillator 410, and outputs the resulting I-component signal to synthesizer 414.

Multiplier 408-2 multiplies the Q-component after pulse waveform shaping, with the carrier which is outputted from local oscillator 410 and which includes the phase shifted by $\pi/2$ by $\pi/2$ phase shifter 412, and outputs the resulting Q-component signal to synthesizer 414.

Synthesizer 414 combines the I-component signal and Q-component signal.

As described above, according to the present embodiment, the signal point arrangement is shared between ASK modulation mode and QPSK modulation mode, and using a QPSK signal forming circuit formed with mapping section 121, I-value setting section 404-1, Q-value setting section 404-2, pulse waveform shaping sections 406-1 and 406-2, multipliers 408-1 and 408-2, local oscillator 410, $\pi/2$ phase shifter 412 and synthesizer 414, in case of ASK modulation mode, mapping section 121 outputs zero as the I-component and Q-component to I-value setting section 404-1 and Q-value setting section 404-2 when input data is "0," selects a signal point from the four signal points in the signal point arrangement in FIG. 5 when input data is "1" and outputs the I-component and Q-component matching the selected signal point to I-value setting section 404-1 and Q-value setting section 404-2 to form an on signal in ASK modulation. By this means, both modulation schemes can be supported by sharing the QPSK signal forming circuit and ASK modulation signal forming circuit without increasing the circuit scale. Further, the signal power of an on signal in ASK modulation matches with the signal power of a QPSK modulation signal, so that it is possible to prevent a decrease in the signal power upon modulation mode switching and reduce deterioration of received quality.

Embodiment 3

Figure 13:
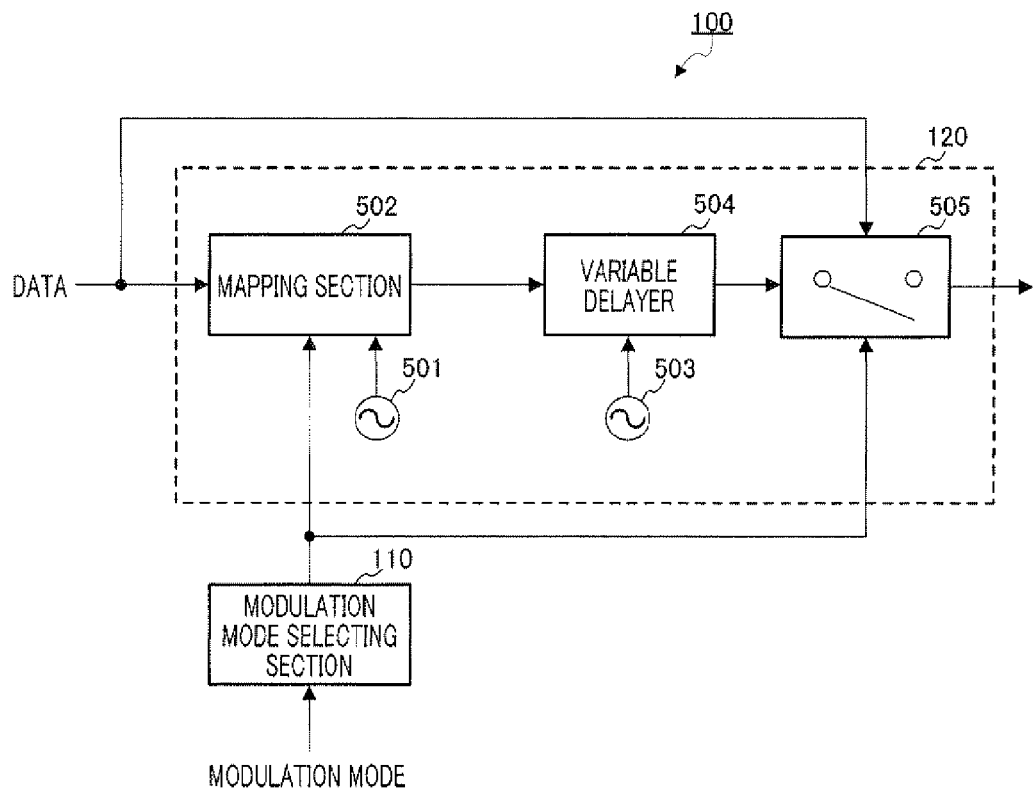
FIG. 13 is a block diagram showing main components of the UWB transmitting apparatus according to Embodiment 3 of the present invention.

FIG. 13 shows main components of transmission signal forming section 120. Transmission signal forming section 120 shown in FIG. 13 has clock signal source 501, mapping section 502, carrier signal source 503, variable delayer 504 and switch 505.

Mapping section 502 selects the phase of a sine wave outputted from carrier signal source 503 based on a clock signal after frequency conversion according to the modulation mode and outputs a control signal for controlling the phase of the sine wave, to variable delayer 504. To be more specific, mapping section 502 selects one of signal points 201, 202, 203 and 204 shown in FIG. 5 when the modulation mode is ASK modulation mode and data is "1," and outputs a control signal for shifting the phase of the sine wave by $\pi/4$, $3\pi/4$, $5\pi/4$ or $7\pi/4$ to variable delayer 504 according to the phase matching the selected signal point. On the other hand, in case of QPSK modulation mode, mapping section 502 outputs a control signal for shifting the phase of the sine wave by $\pi/4$, $3\pi/4$, $5\pi/4$ and $7\pi/4$ to variable delayer 504 according to the phases of four signal points in the signal point arrangement shown in FIG. 5 matching two bits of input data. Further, mapping section 502 makes the clock signal outputted from clock signal source 501 an original signal, carries out frequency conversion of the frequency of the clock signal by a multiple so as to be equal to the modulation rate and generates a control signal for controlling the phase of the sine wave based on the clock signal after conversion.

Variable delayer 504 shifts the phase of the sine wave outputted from carrier signal source 503 according to the control signal outputted from mapping section 502 and outputs the sine wave after phase shift, to switch 505.

Incase of QPSK modulation mode, switch 505 keeps the switch on at all times and outputs a generated QPSK modulation signal. On the other hand, in case of ASK modulation mode, switch 505 is switched on and outputs an on signal when data is "1," and is switched off when data is "0."

Figure 14:
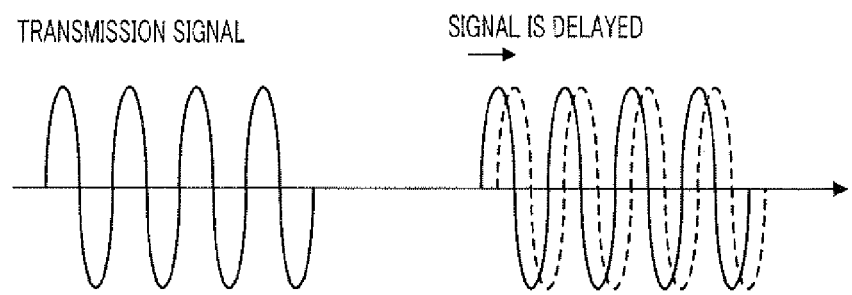
FIG. 14 shows a waveform of a QPSK modulation signal formed by the UWB transmitting apparatus according to Embodiment 3.

FIG. 14 shows a waveform diagram of a QPSK modulation signal formed in this way. As shown in FIG. 14, transmission signal forming section 120 according to the present embodiment forms a QPSK modulation signal by shifting in variable delayer 504 the phase of the sine wave outputted from carrier signal source 503. For example, assuming the carrier frequency is 60 GHz, one cycle is about 16.7 psec, so that, by delaying the phase of the sine wave by about 4 psec in variable delayer 504, the phase of the carrier is shifted by $\pi/2$, the QPSK modulation signal is thereby generated using all of signal points 201 to 204 shown in FIG. 5.

Further, in case of ASK modulation mode, by delaying the sine wave by about 4 psec, all of four signal points on the IQ plane in QPSK modulation are used as signal points for the on signal, so that it is possible to precisely acquire synchronization upon QPSK demodulation.

Figure 15:
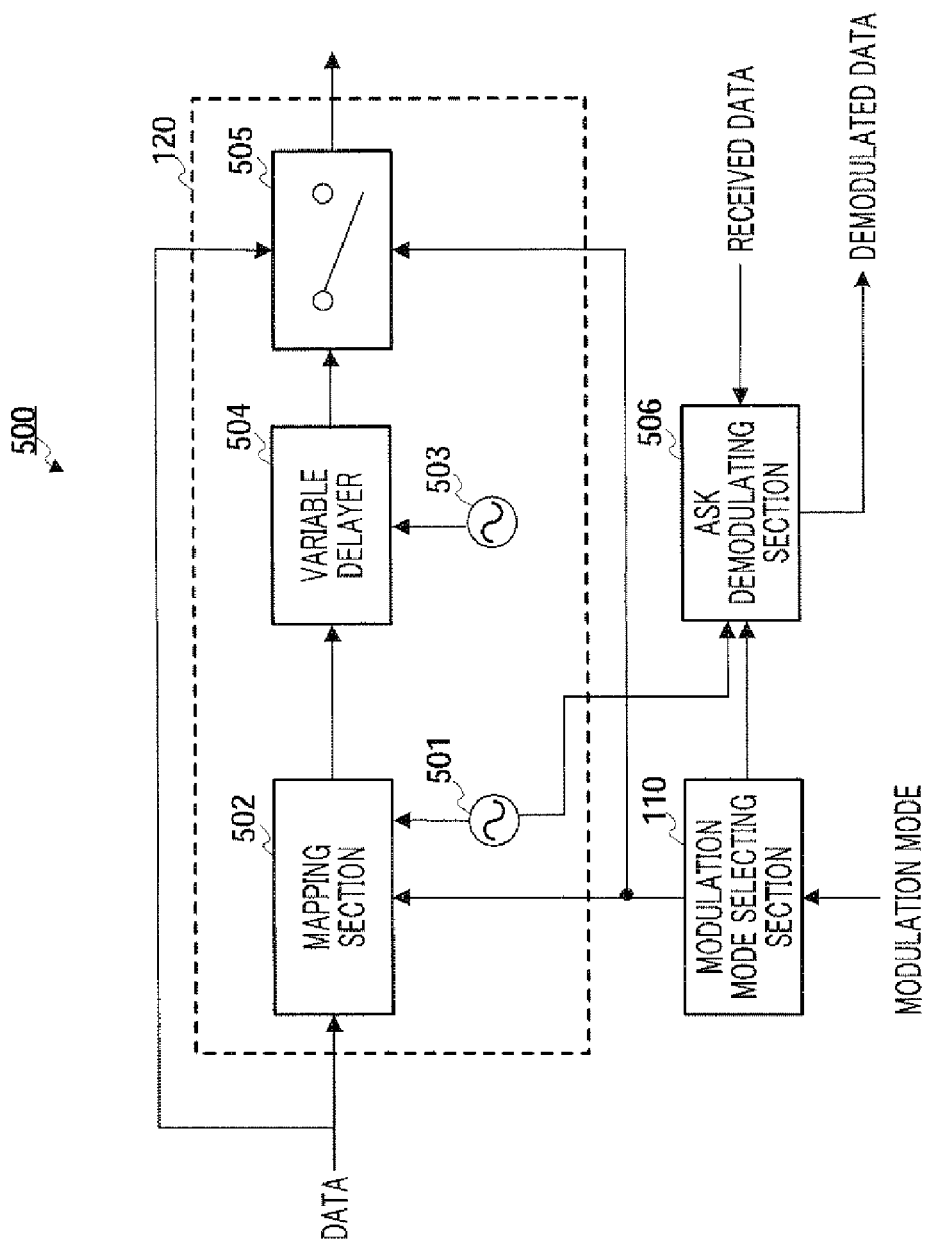
FIG. 15 is a block diagram showing main components of the UWB communication apparatus according to Embodiment 3.

FIG. 15 shows main components of a UWB communication apparatus having a receiving function. In the UWB communication apparatus in FIG. 15 of the present embodiment, components common in FIG. 13 will be assigned the same reference numerals and description thereof will be omitted. UWB communication apparatus 500 shown in FIG. 15 employs a configuration adding ASK demodulating section 506 to UWB transmitting apparatus 100 shown in FIG. 13. ASK demodulating section 506 demodulates an ASK modulation signal in case of ASK modulation mode by detecting an on/off signal by, for example, threshold value decision, and demodulates a QPSK modulation signal in case of QPSK modulation mode by making the clock signal outputted from clock signal source 501 the original signal, carrying out frequency conversion of the frequency of the clock signal by a multiple so as to be equal to the modulation rate and deciding the phase of the sine wave based on the clock signal after conversion.

As described above, according to the present embodiment, the signal point arrangement is shared between ASK modulation mode and QPSK modulation mode, the QPSK modulation signal forming circuit is formed by adding variable delayer 504 to the ASK modulation signal forming circuit formed with clock signal source 501, mapping section 502, carrier signal source 503 and switch 505, and mapping section 502 selects four signal points in the signal point arrangement shown in FIG. 5 per two bit of input data, and outputs a control signal for shifting the phase of the sine wave by $\pi/4$, $3\pi/4$, $5\pi/4$ and $7\pi/4$, to variable delayer 504 according to the phases of the selected signal points to form a QPSK modulation signal. By this means, by sharing an ASK modulation signal forming circuit and a QPSK signal forming circuit, both modulation schemes can be supported without increasing the circuit scale. Further, the signal power of an on signal in ASK modulation matches with the signal power of a QPSK modulation signal, so that it is possible to prevent a decrease in the signal power upon modulation mode switching and reduce deterioration of received quality.

Further, although a case has been described with the above description where, when the modulation mode switches from ASK modulation mode to QPSK modulation mode, the phase is shifted by 4 psec upon ASK modulation, so that synchronization can be acquired accurately, if only the phase needs to be randomized upon ASK demodulation, it is not necessary to say that variable delayer 504 only needs to adequately add delay of several psecs per transmission.

Furthermore, although a case has been described with the above description where, when the modulation mode is ASK modulation mode and data is "1" as described in FIG. 14, one of signal points 201, 202, 203 and 204 shown in FIG. 5 is selected, a control signal for shifting the phase of the sine wave by $\pi/4$, $3\pi/4$, $5\pi/4$ and $7\pi/4$ is outputted to variable delayer 504 according to the phase matching the selected signal point and phase modulation is carried out, the phase may be fixed. Still further, an ASK modulation signal may be generated by selecting the phase of the sine wave from four phases when the communicating party has a demodulator that can demodulate a phase modulation signal or using only the fixed phase when the communicating party cannot demodulate the phase modulation signal.

Embodiment 4

Figure 16:
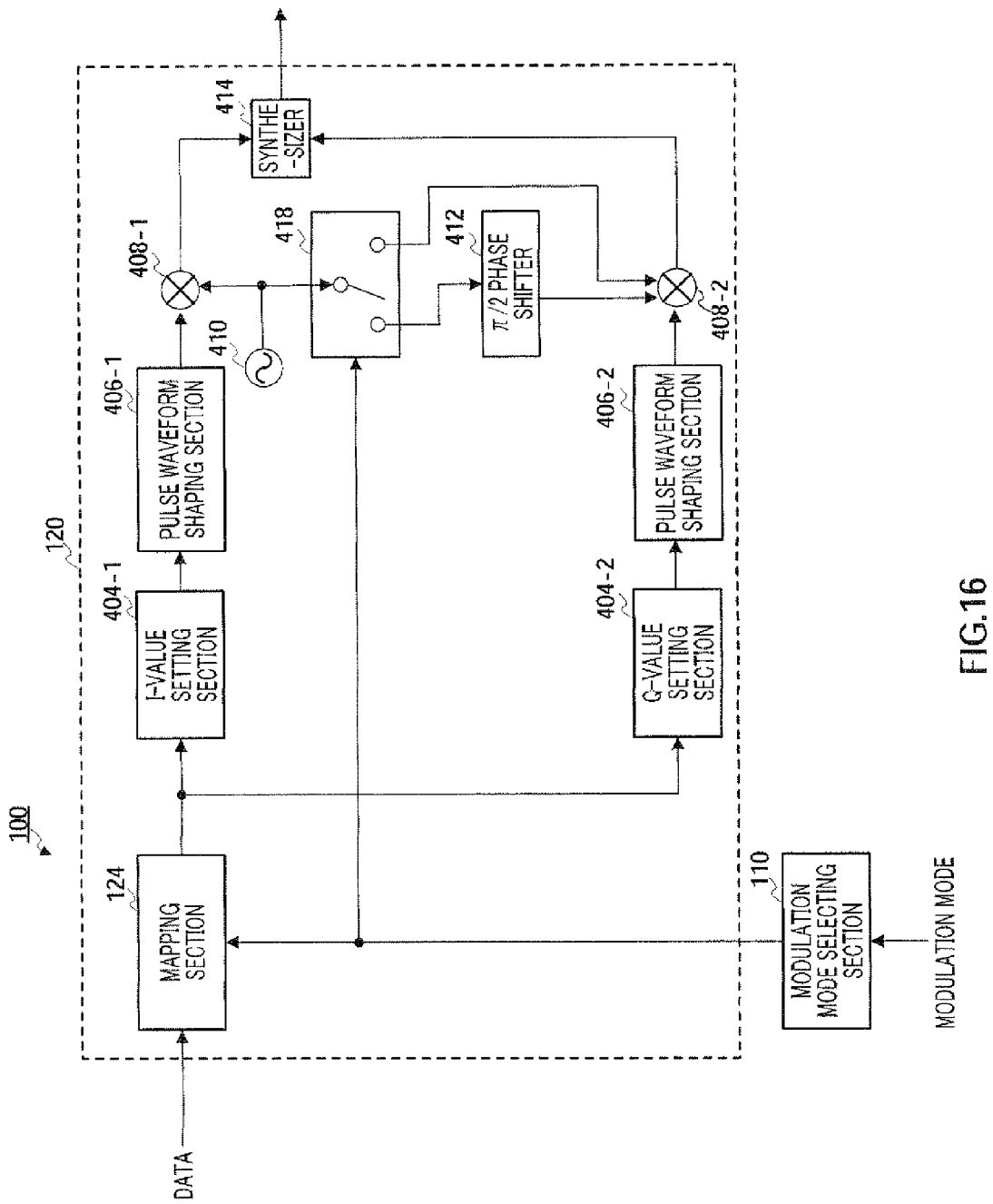
FIG. 16 is a block diagram showing main components of the UWB transmitting apparatus according to Embodiment 4 of the present invention.

FIG. 16 shows main components of transmission signal forming section 120. In transmission signal forming section 120 in FIG. 16 of the present embodiment, components common to FIG. 12 will be assigned the same reference numerals as in FIG. 12 and description thereof will be omitted. Compared to FIG. 12, FIG. 16 shows a configuration including mapping section 124 instead of mapping section 121 and adding switch 418 between local oscillator 410 and $\pi/2$ phase shifter 412.

Incase of QPSK modulation mode, mapping section 124 outputs the I-component and Q-component of a signal point matching two bits of input data, to I-value setting section 404-1 and Q-value setting section 404-2. On the other hand, in case of ASK modulation mode, mapping section 124 outputs zero as the I-component and Q-component to I-value setting section 404-1 and Q-value setting section 404-2 when input data is "0," and selects the I-component and Q-component matching signal point 201 or 203 in the signal point arrangement of FIG. 5 when input data is "1" and outputs the I-component and Q-component to I-value setting section 404-1 and Q-value setting section 404-2. That is, in case of ASK modulation mode, only the signal points in which the I-component and Q-component are equal are selected.

Switch 418 outputs the carrier outputted from local oscillator 410, to $\pi/2$ phase shifter 412 when the modulation mode outputted from modulation mode selecting section 110 is QPSK modulation mode, and outputs the carrier to multiplier 408-2 when the modulation mode is ASK modulation.

By this means, similar to the case of FIG. 12, a QPSK modulation signal is formed in case of QPSK modulation mode and the phases of the carriers multiplied upon the I-component and the carrier multiplied upon the Q-component are in-phase, and in-phase components are added by synthesizer 414, so that an on signal is generated. Consequently, compared to the case where an on/off signal is generated by simply making the Q-component zero and changing the I-component between zero and a predetermined value, it is possible to increase the signal power of an on signal in ASK modulation and reduce deterioration of received quality.

As described above, according to the present embodiment, in case of ASK modulation mode, mapping section 124 selects a signal point in which the I-component and the Q-component are equal when input data is "1" and multiplies the I-component and Q-component by in-phase carriers outputted from local oscillator 410. Consequently, in-phase components are added in synthesizer 414 and an on signal is generated upon ASK modulation. By this means, compared to the case where an on/off signal is generated by simply changing only the I-component between zero and a predetermined value, it is possible to increase the signal power of an on signal in ASK modulation and reduce deterioration of received quality.

An aspect of the UWB transmitting apparatus according to the present invention that enables in amplitude modulation mode and transmission in phase modulation mode, employs a configuration including: a selecting means that selects one of the amplitude modulation mode and the phase modulation mode; and a transmission signal forming means that, when selected mode is the amplitude modulation mode, generates an amplitude modulation signal using a first value as an amplitude level, by forming a symbol located in an original point on an IQ plane, or generates an amplitude modulation signal using a second value as an amplitude level, by forming a symbol located in one of a plurality of signal points on the IQ plane in phase modulation, according to data per symbol and, when the selected mode is the phase modulation mode, generates a phase modulation signal by forming a symbol located in one of the plurality of signal points on the IQ plane in the phase modulation, according to the data per symbol.

According to this configuration, in case of amplitude modulation mode, the UWB transmitting apparatus according to the present invention is able to generate an amplitude modulation signal of an off signal by forming the symbol located in the original point on the IQ plane and generate the on signal in amplitude modulation by forming the symbol located in one of a plurality of signal points on the IQ plane. Consequently, compared to the case where an on/off signal is generated by simply making the Q-component zero and changing the I-component between zero and a predetermined value, the signal power of an on signal in amplitude modulation matches with the signal power of a phase modulation signal, so that the UWB transmitting apparatus according to the present invention is able to prevent a decrease in the signal power upon modulation mode switching and reduce deterioration of received quality.

An aspect of the UWB transmitting apparatus according to the present invention employs a configuration in which amplitude modulation carried out in the amplitude modulation mode is OOK modulation.

According to this configuration, in case of amplitude modulation mode, the UWB transmitting apparatus according to the present invention is able to generate an OOK modulation signal of an off signal by forming the symbol located in the original point on the IQ plane and generate the on signal in OOK modulation by forming the symbol located in one of a plurality of signal points on the IQ plane. Consequently, compared to the case where an on/off signal is generated by simply making the Q-component zero and changing the I-component between zero and a predetermined value, the signal power of an on signal in OOK modulation matches with the signal power of a phase modulation signal, so that the UWB transmitting apparatus according to the present invention is able to prevent a decrease in the signal power upon modulation mode switching and reduce deterioration of received quality.

An aspect of the UWB transmitting apparatus according to the present invention employs a configuration in which phase modulation carried out in the phase modulation mode is BPSK modulation.

An aspect of the UWB transmitting apparatus according to the present invention employs a configuration in which phase modulation carried out in the phase modulation mode is QPSK modulation.

According to these configurations, in case of amplitude modulation mode, the UWB transmitting apparatus according to the present invention is able to generate an on signal by forming the symbol located in a signal point on the IQ plane in BPSK and QPSK modulation according to data per bit. Consequently, the UWB transmitting apparatus according to the present invention is able to prevent a decrease in the signal power of an amplitude modulation signal and support both modulation schemes of the amplitude modulation scheme and BPSK and QPSK modulation scheme.

An aspect of the UWB transmitting apparatus according to the present invention employs a configuration in which amplitude modulation carried out in the amplitude modulation mode is OOK modulation; and phase modulation carried out in the phase modulation mode is BPSK modulation.

According to this configuration, in case of OOK modulation mode, the UWB transmitting apparatus according to the present invention is able to generate an on signal by forming the symbol located in a signal point on the IQ plane in BPSK modulation according to data per bit. Consequently, the UWB transmitting apparatus according to the present invention is able to prevent a decrease in the signal power of an OOK modulation signal, reduce deterioration of received quality and support both modulation schemes of the OOK modulation scheme and BPSK modulation scheme.

An aspect of the UWB transmitting apparatus according to the present invention employs a configuration in which amplitude modulation carried out in the amplitude modulation mode is ASK modulation; phase modulation carried out in the phase modulation mode is QPSK modulation; and when the selected mode is ASK modulation mode, the transmission signal forming means generates an ASK modulation signal using the first value as the amplitude level, by forming the symbol located in the original point on the IQ plane, or generates an ASK modulation signal using the second value as the amplitude level, by forming the symbol located in one of four signal points on the IQ plane in QPSK modulation, according to one bit data and, when the selected mode is QPSK modulation mode, generates a QPSK modulation signal by forming the symbol located in one of the four signal points on the IQ plane in the QPSK modulation, according to two bit data.

According to this configuration, in case of ASK modulation mode, an ASK modulation signal of an off signal can be generated by forming the symbol located in the original point on the IQ plane and an on signal in ASK modulation can be generated by forming the symbol located in one of four signal points on the IQ plane in QPSK modulation.

That is, in the UWB transmitting apparatus according to the present invention that enables transmission in ASK modulation mode and transmission in QPSK modulation mode, according to the modulation mode from a controlling section (not shown), a modulation mode selecting section commands a mapping section whether to perform mapping in ASK modulation or in QPSK modulation. Here, if the selected mode is ASK modulation mode, an ASK modulation signal using the first value as the amplitude level is formed by forming the symbol located in the original point on the IQ plane or the symbol located in one of four signal points on the IQ plane in QPSK modulation, is formed according to one bit data. By this means, the UWB transmitting apparatus according to the present invention generates an ASK modulation signal using a second value as the amplitude level, and, when the selected mode is QPSK modulation mode, generates a QPSK modulation signal by, according to two bit data, forming the symbol located in one of four signal points on the IQ plane in QPSK modulation.

Consequently, compared to a case where an on/off signal is generated by simply making the Q-component zero and changing the I-component between zero and a predetermined value, the signal power of an on signal in ASK modulation matches with the signal power of a QPSK modulation signal, so that it is possible to prevent a decrease in the signal power upon modulation mode switching and reduce deterioration of received quality.

An aspect of the UWB transmitting apparatus according to the present invention employs a configuration in which, when the selected mode is the ASK modulation mode, the transmission signal forming means generates the ASK modulation signal using the second value as the amplitude level, by forming a symbol transferred over time to two or more of the four signal points on the IQ plane in the QPSK modulation.

According to this configuration, upon ASK modulation, an on signal can be generated by using two or more of four signal points on the IQ plane in QPSK modulation. Consequently, it is possible to acquire synchronization in QPSK modulation at the same time upon ASK modulation and reduce the synchronization time for the QPSK modulation signal of when the modulation mode switches from ASK modulation mode to QPSK modulation mode.

An aspect of the UWB transmitting apparatus according to the present invention employs a configuration in which, when the selected mode is the ASK modulation mode, the transmission signal forming means generates the ASK modulation signal using the second value as the amplitude level, by forming a symbol transferred with an equal probability to the four signal points on the IQ plane in the QPSK modulation.

According to this configuration, upon ASK modulation, an on signal can be generated using with the equal probability each signal point on the IQ plane in QPSK modulation, and so the synchronizing location can be calculated more precisely, so that it is possible to improve reception precision.

An aspect of the UWB transmitting apparatus according to the present invention employs a configuration in which, regardless of the selected mode, the transmission signal forming means generates a preamble of a transmission frame from the symbol located in the four signal points on the IQ plane in the QPSK modulation.

According to this configuration, a preamble is shared between QPSK modulation and ASK modulation, so that, when the modulation mode switches from ASK modulation mode to QPSK modulation mode, it is possible to shorten the synchronization acquisition time to demodulate the QPSK modulation signal. Further, the preamble length of the preamble required for synchronization acquisition can be shortened, and, consequently, the payload can be transmitted efficiently.

An aspect of the UWB transmitting apparatus according to the present invention employs a configuration in which the transmission signal forming means includes: a mapping means that sets an I-component and Q-component of the symbol according to the one or two bit data and the selected mode; a local oscillator that generates a carrier; a first multiplier that multiplies the I-component with the carrier; a $\pi/2$ phase shifter that shifts a phase of the carrier by $\pi/2$; a second multiplier that multiplies the Q-component with the carrier of the phase shifted by the $\pi/2$ phase shifter; and a synthesizer that synthesizes the I-component and the Q-component each multiplied with the carrier.

According to this configuration, an ASK modulation signal can be formed using a processing section for forming a QPSK modulation signal, so that it is possible to support both modulation schemes without increasing the circuit scale.

An aspect of the UWB transmitting apparatus according to the present invention employs a configuration in which the transmission signal forming means includes: a local oscillator that generates a carrier; a variable delayer that shifts a phase of the carrier according to the one or two bit data and the selected mode; and a switching means that, when the selected mode is the ASK modulation mode, switches whether or not to pass the carrier according to the one bit data.

According to this configuration, a QPSK modulation signal can be formed using a processing section for forming an ASK modulation signal so that it is possible to support both modulation schemes without increasing the circuit scale.

An aspect of the UWB transmitting apparatus according to the present invention employs a configuration in which the $\pi/2$ phase shifter includes a switching means that, when the selected mode is the ASK modulation mode, outputs the carrier to the second multiplier; and when the selected mode is the ASK modulation mode, the mapping means sets to the Q-component the I-component of the symbol and a component equal to the I-component.

According to this configuration, in case of ASK modulation mode, an on signal can be formed by making in-phase the phases of the carrier multiplied upon the I-component and the carrier multiplied upon the Q-component and adding the in-phase components, so that, compared to the case an on/off signal is generated by simply making the Q-component zero and changing the I-component between zero and a predetermined value, it is possible to reduce deterioration of received quality due to an increase in the signal power of the on signal in ASK modulation.

An aspect of the UWB transmitting apparatus according to the present invention employs a configuration in which phase modulation carried out in the phase modulation mode is phase modulation mode including M-ary QAM modulation; amplitude modulation carried out in the amplitude modulation mode is amplitude modulation not including M-ary QAM modulation; and when the selected mode is the amplitude modulation mode, the transmission signal forming means generates the amplitude modulation signal using the first value as the amplitude level, by forming the symbol located in the original point on the IQ plane, or generates the amplitude modulation signal using the second value as the amplitude level, by forming the symbol located in one of the plurality of signal points on the IQ plane in M-ary QAM modulation, according to data per symbol and, when the selected mode is the phase modulation mode, generates the phase modulation signal by forming the symbol located in one of the plurality of signal points on the IQ plane in the M-ary QAM modulation, according to the data per symbol.

According to this configuration, according to data per symbol, an M-ary ASK modulation signal can be generated by forming the symbol located in one of a plurality of signal points on the IQ plane in M-ary QAM modulation, and so a preamble can be shared between M-ary ASK modulation and M-ary QAM modulation, so that, when the modulation mode switches from M-ary ASK modulation mode to M-ary QAM modulation mode, it is possible to shorten the synchronization acquisition time to demodulate the M-ary QAM modulation signal.

The disclosures of Japanese Patent Application No. 2006-281746, filed on Oct. 16, 2006, and Japanese Patent Application No. 2007-263472, filed on Oct. 9, 2007, including the specifications, drawings and abstracts, are incorporated herein by reference in their entirety.

INDUSTRIAL APPLICABILITY

In a system where there are the amplitude modulation scheme and phase modulation scheme, the UWB transmitting apparatus and UWB transmitting method according to the present invention can prevent a decrease in the signal power of an amplitude modulation signal and support both modulation schemes of the amplitude modulation scheme and phase modulation scheme. More particularly, in a UWB system where there are the amplitude modulation scheme and phase modulation scheme, the UWB transmitting apparatus and UWB transmitting method according to the present invention are useful in the UWB transmitting apparatus and UWB transmitting method for supporting both modulation schemes.

The invention claimed is:

1. An ultra wideband transmitting apparatus that enables transmission in amplitude shift keying modulation mode and transmission in quadrature phase shift keying modulation mode, the ultra wideband transmitting apparatus comprising:
a selecting section that selects one of the amplitude shift keying modulation mode and the quadrature phase shift keying modulation mode; and
a transmission signal forming section that (1), when the selected mode is the amplitude shift keying modulation mode, generates, according to one bit data, one of (i) a first amplitude shift keying modulation signal which uses a first value as an amplitude level by forming a symbol located in an original point on an in-phase and quadrature plane and (ii) a second amplitude shift keying modulation signal which uses a second value as the amplitude level by forming a symbol located in one of four signal points on the in-phase and quadrature plane and used in quadrature phase shift keying modulation, and (2), when the selected mode is the quadrature phase shift keying modulation mode, generates, according to two bit data, a quadrature phase shift keying modulation signal by forming a symbol located in one of the four signal points on the in-phase and quadrature plane and used in the quadrature phase shift keying modulation.

2. The ultra wideband transmitting apparatus according to claim 1, wherein, when the selected mode is the amplitude shift keying modulation mode, the transmission signal forming section generates the second amplitude shift keying modulation signal by forming a symbol transferred over time to two or more of the four signal points on the in-phase and quadrature plane and used in the quadrature phase shift keying modulation.

3. The ultra wideband transmitting apparatus according to claim 1, wherein, when the selected mode is the amplitude shift keying modulation mode, the transmission signal forming section generates the second amplitude shift keying modulation signal by forming a symbol transferred with an equal probability to the four signal points on the in-phase and quadrature plane and used in the quadrature phase shift keying modulation.

4. The ultra wideband transmitting apparatus according to claim 1, wherein, regardless of the selected mode, the transmission signal forming section generates a preamble of a transmission frame from the symbol located in the four signal points on the in-phase and quadrature plane and used in the quadrature phase shift keying modulation.

5. The ultra wideband transmitting apparatus according to claim 1, wherein the transmission signal forming section comprises:
a mapping section that sets an in-phase component and quadrature component of the symbol according to the one or two bit data and the selected mode;
a local oscillator that generates a carrier;
a first multiplier that multiplies the in-phase component with the carrier;
a $\pi/2$ phase shifter that shifts a phase of the carrier by it $\pi/2$;
a second multiplier that multiplies the quadrature component with the carrier of the phase shifted by the $\pi/2$ phase shifter; and
a synthesizer that synthesizes the in-phase component and the quadrature component each multiplied with the carrier.

6. The ultra wideband transmitting apparatus according to claim 1, wherein the transmission signal forming section comprises:
a local oscillator that generates a carrier;
a variable delayer that shifts a phase of the carrier according to the one or two bit data and the selected mode; and
a switching section that, when the selected mode is the amplitude shift keying modulation mode, switches whether or not to pass the carrier according to the one bit data.

7. The ultra wideband transmitting apparatus according to claim 5, wherein:
the $\pi/2$ phase shifter comprises a switching section that, when the selected mode is the amplitude shift keying modulation mode, outputs the carrier to the second multiplier; and
when the selected mode is the amplitude shift keying modulation mode, the mapping section sets to the quadrature component the in-phase component of the symbol and a component equal to the in-phase component.

8. An ultra wideband transmitting method of enabling transmission in amplitude shift keying modulation mode and transmission in quadrature phase shift keying modulation mode, the ultra wideband transmitting method comprising:
selecting one of the amplitude shift keying modulation mode and the quadrature phase shift keying modulation mode; and
(1) when the selected mode is the amplitude shift keying modulation mode, generating, according to one bit data, one of (i) a first amplitude shift keying modulation signal which uses a first value as an amplitude level by forming a symbol located in an original point on an in-phase and quadrature plane and (ii) a second amplitude shift keying modulation signal which uses a second value as the amplitude level, by forming a symbol located in one of four signal points on the in-phase and quadrature plane and used in quadrature phase shift keying modulation, and (2), when the selected mode is the quadrature phase shift keying modulation mode, generating, according to two bit data, a quadrature phase shift keying modulation signal by forming a symbol located in one of the four signal points on the in-phase and quadrature plane and used in the quadrature phase shift keying modulation.

* * * * *